United States Patent
Chen et al.

(10) Patent No.: US 9,280,188 B2
(45) Date of Patent: Mar. 8, 2016

(54) THERMAL CONTROL METHOD AND THERMAL CONTROL SYSTEM

(71) Applicant: MEDIATEK INC., Hsin-Chu (TW)

(72) Inventors: Tai-Yu Chen, Taipei (TW); Wen-Tsan Hsieh, Hsinchu County (TW); Chi-Wei Yang, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 39 days.

(21) Appl. No.: 14/294,170

(22) Filed: Jun. 3, 2014

(65) Prior Publication Data

US 2015/0346785 A1 Dec. 3, 2015

(51) Int. Cl.
*H04M 1/725* (2006.01)
*G06F 1/20* (2006.01)
*H04M 1/18* (2006.01)

(52) U.S. Cl.
CPC *G06F 1/206* (2013.01); *H04M 1/18* (2013.01)

(58) Field of Classification Search
CPC .............................. H05K 7/20945; G06F 1/206
See application file for complete search history.

(56) References Cited

U.S. PATENT DOCUMENTS

| | | | | |
|---|---|---|---|---|
| 8,462,560 | B2* | 6/2013 | Furutani | G11C 8/06 365/189.05 |
| 2006/0193157 | A1* | 8/2006 | Ma | H02M 3/156 363/123 |
| 2006/0221527 | A1* | 10/2006 | Jacobson | G01K 7/42 361/100 |
| 2008/0114967 | A1* | 5/2008 | Saen | G06F 1/3228 712/221 |
| 2015/0208557 | A1* | 7/2015 | Porto | H05K 7/20945 307/117 |

\* cited by examiner

*Primary Examiner* — Bobbak Safaipour
(74) *Attorney, Agent, or Firm* — Winston Hsu; Scott Margo

(57) ABSTRACT

The present invention provides a thermal control method and a thermal control system. The thermal control method comprises: detecting a temperature variance of a component of the electronic device to generate a detecting result; and determining a temperature threshold value for the integrated circuit as a throttling point according to the detecting result. The thermal control system comprises: a detecting unit, for detecting a temperature variance of a component of the electronic device to generate a detecting result; and a determining unit, for determining a temperature threshold value for the integrated circuit as a throttling point according to the detecting result.

20 Claims, 4 Drawing Sheets

_(1)_

THERMAL CONTROL METHOD AND THERMAL CONTROL SYSTEM

BACKGROUND

The disclosed embodiments of the present invention relate to a thermal control method and a thermal control system, and more particularly, to a thermal control method and a thermal control system which can better fit environmental changes and have a better dynamic thermal management.

Please refer to FIG. 1. FIG. 1 is a timing diagram illustrating a conventional thermal control method for a cellphone. As shown in FIG. 1, the conventional thermal control method only detects a current temperature of an SoC of the cellphone, and when the temperature of the SoC attains 90° C. (i.e. a throttling point), the conventional thermal control method starts to throttle (i.e. lower the CPU frequency). Thus, the throttling process happens fast and the throttling degree is big in the conventional thermal control method. For example, the full-speed time of the cellphone in FIG. 1 is only 17 seconds, and the conventional thermal control method starts to throttle after 17 seconds.

SUMMARY

In accordance with exemplary embodiments of the present invention, a thermal control method and a thermal control system are proposed to solve the above-mentioned problem.

According to an aspect of the present invention, an exemplary thermal control method for an integrated circuit in an electronic device is disclosed. The thermal control method comprises: detecting a temperature variance of a component of the electronic device to generate a detecting result; and determining a temperature threshold value for the integrated circuit as a throttling point according to the detecting result.

According to an aspect of the present invention, an exemplary thermal control system for an integrated circuit in an electronic device is disclosed. The thermal control system comprises: a detecting unit, for detecting a temperature variance of a component of the electronic device to generate a detecting result; and a determining unit, for determining a temperature threshold value for the integrated circuit as a throttling point according to the detecting result.

Briefly summarized, the thermal control method and the thermal control system disclosed by the present invention can achieve a better CPU performance without too hot in the skin of the electronic device, and the present invention can better fit environmental changes and have a better dynamic thermal management.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
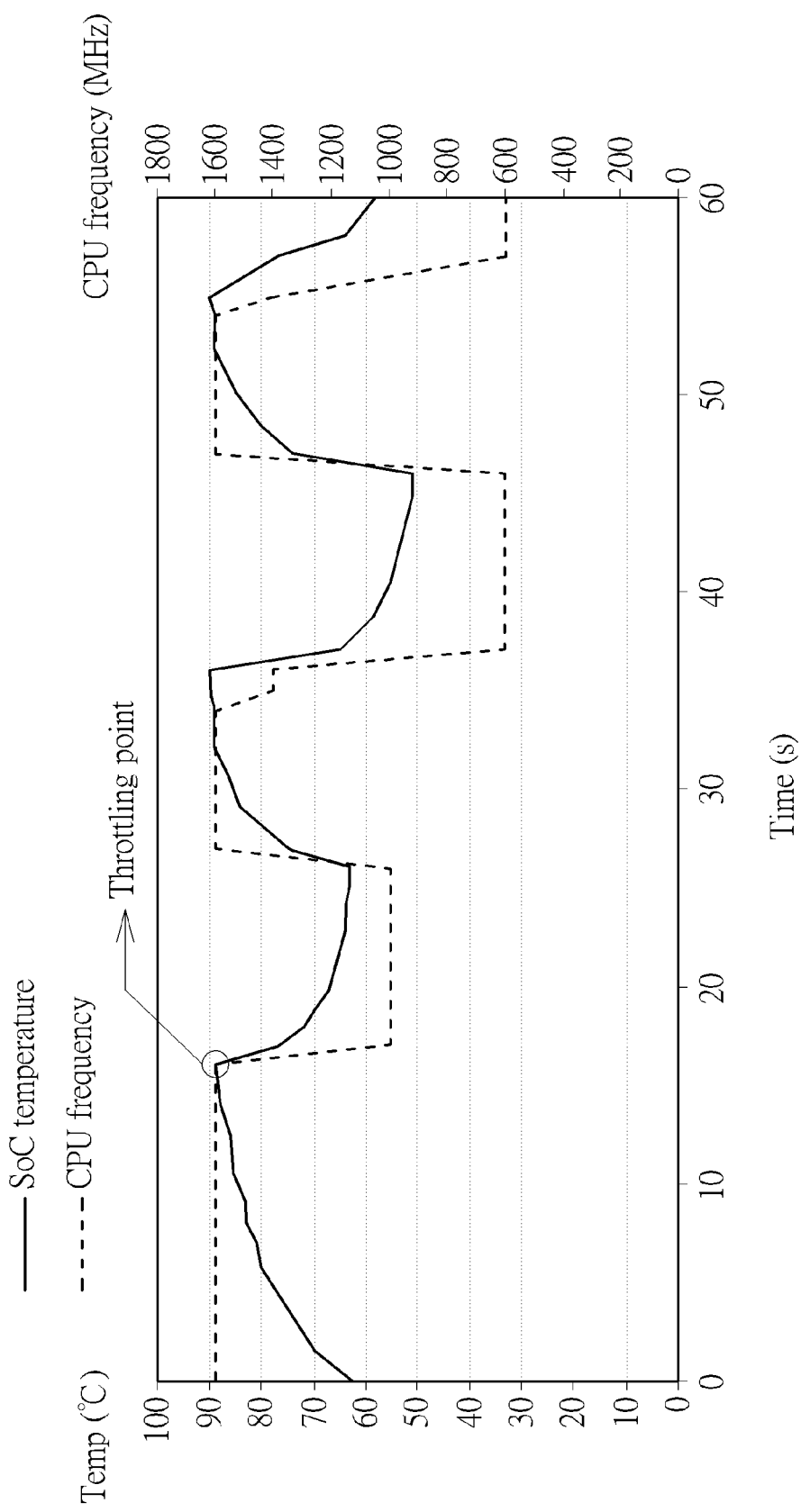
FIG. 1 is a timing diagram illustrating a conventional thermal control method for a cellphone.
Figure 2:
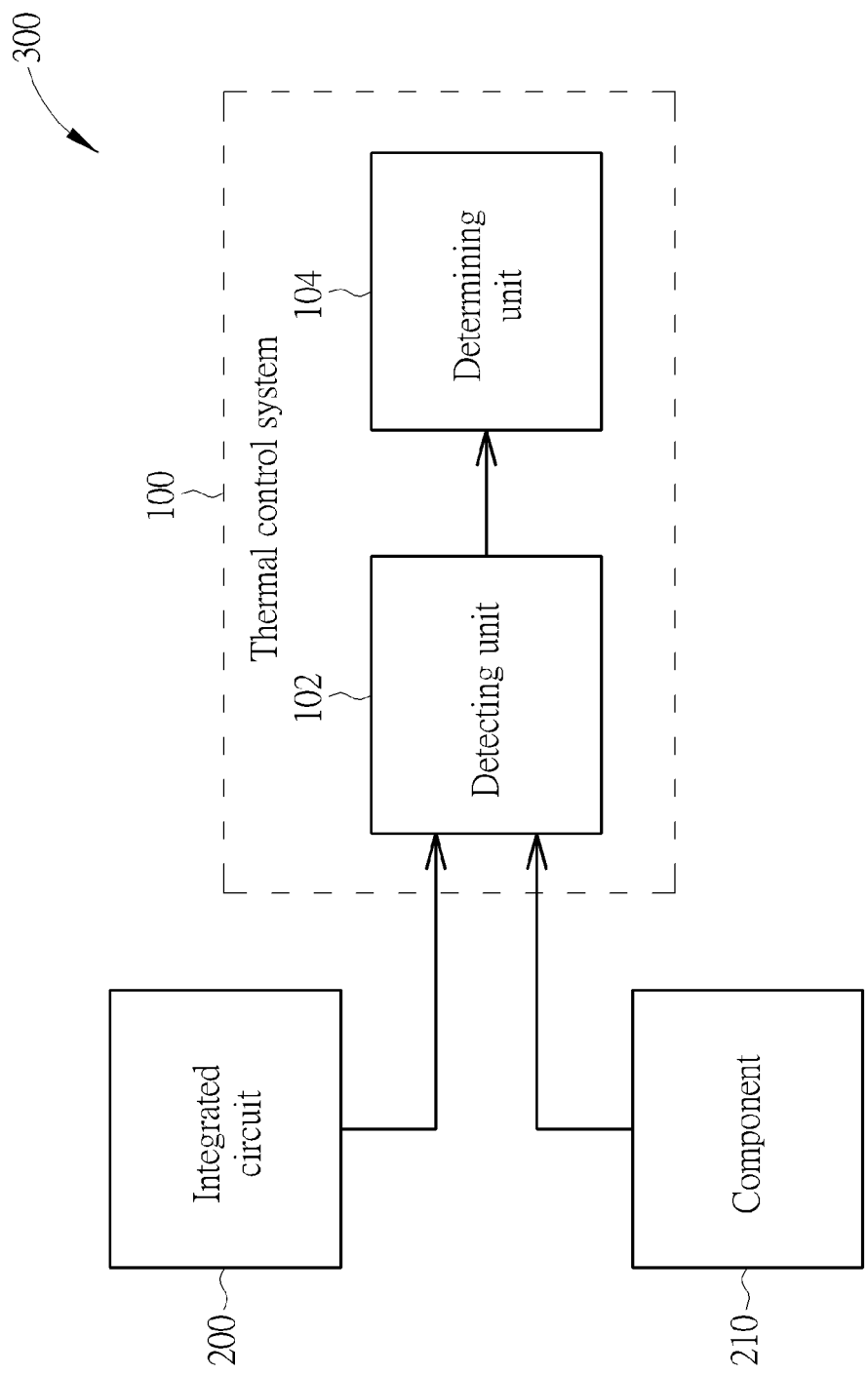
FIG. 2 is a simplified diagram of a thermal control system for an integrated circuit in an electronic device according to an exemplary embodiment of the present invention.

Please refer to FIG. 2. FIG. 2 is a simplified diagram of a thermal control system 100 for an integrated circuit 200 in an electronic device 300 according to an exemplary embodiment of the present invention, wherein the electronic device 300 can be a cellphone, and the integrated circuit 200 can be a system on chip (SoC) of the cellphone. As shown in FIG. 2, the thermal control system 100 comprises: a detecting unit 102 and a determining unit 104. The detecting unit 102 is utilized for detecting a temperature variance of a component 210 of the electronic device 300 to generate a detecting result, wherein the component 210 can be a printed circuit board (PCB) of the cellphone.

The function of the detecting unit 102 of detecting the temperature variance of the component 210 of the electronic device 300 to generate the detecting result comprises: detecting a current temperature value of the component 210; determining an initial temperature value of the component 210; and comparing the current temperature value with the initial temperature value of the component 210 to generate the detecting result.

The function of determining the initial temperature value of the component 210 comprises: comparing the detected current temperature value with a first temperature threshold value; if the detected current temperature value is higher than the first temperature threshold value, then utilizing the first temperature threshold value as the initial temperature value of the component 210; and if the detected current temperature value is lower than the first temperature threshold value, then utilizing a power value of the integrated circuit 200, a package thermal resistance coefficient, and an ambient temperature value to calculate the initial temperature value of the component 210. The first temperature threshold value is corresponding to a predetermined temperature threshold value of a housing of the electronic device 300 (i.e. the skin of the electronic device 300).

The determining unit 104 is coupled to detecting unit 102, and utilized for determining a temperature threshold value for the integrated circuit 200 as a throttling point according to the detecting result.

The function of determining the temperature threshold value for the integrated circuit 200 according to the detecting result comprises: if the detecting result shows the temperature variance is lower than a predetermined temperature value, then utilizing a predetermined temperature threshold value as the temperature threshold value for the integrated circuit 200; and if the detecting result shows the temperature variance is not lower than a predetermined temperature value, then determining a second temperature threshold value as the temperature threshold value for the integrated circuit 200, wherein the second temperature threshold value is lower than the predetermined temperature threshold value.

The function of determining the second temperature threshold value comprises: calculating a difference between the second temperature threshold value and a temperature variance of the integrated circuit 200 corresponding to the temperature variance of the component 210 to generate a calculating result; comparing the calculating result with the first temperature threshold value; if the calculating result is higher than the first temperature threshold value, then utilizing the calculating result as the second temperature threshold value; and if the calculating result not higher than the first temperature threshold value, then utilizing the first temperature threshold value as the second temperature threshold value.

For example, the detecting unit 102 detects a current temperature value of the component 210. Next, the detecting unit 102 compares the detected current temperature value with a first temperature threshold value of 70° C., wherein the first temperature threshold value is corresponding to a predetermined temperature threshold value of 50° C. of a housing of the electronic device 300 (i.e. the skin of the electronic device 300). If the detected current temperature value is 75° C., which is higher than the first temperature threshold value of 70° C., then the first temperature threshold value of 70° C. will be utilized as the initial temperature value of the component 210. Please note that the above embodiment is only for an illustrative purpose and is not meant to be a limitation of the present invention. For example, the first temperature threshold value can be changed according to different cellphones.

If the detected current temperature value is 55° C., which is lower than the first temperature threshold value of 70° C., then a power value of the integrated circuit 200, a package thermal resistance coefficient, and an ambient temperature value will be utilized to calculate the initial temperature value of the component 210. For example, the initial temperature value can be calculated by multiplying the power value of the integrated circuit 200 with the package thermal resistance coefficient and adding the ambient temperature value (for example, 25° C.) to be 50° C. Please note that the above embodiment is only for an illustrative purpose and is not meant to be a limitation of the present invention. For example, the ambient temperature value can be changed according to different conditions, and the initial temperature value will be changed accordingly.

Next, the detecting unit 102 compares the current temperature value with the initial temperature value of the component 210 to generate the detecting result, and the determining unit 104 determines a temperature threshold value for the integrated circuit 200 as a throttling point according to the detecting result.

For example, if the current temperature value of the component 210 is 75° C. and the initial temperature value of the component 210 is 70° C., and a predetermined temperature value is 10° C., then the detecting result shows the temperature variance of the component 210 is 5° C., which is lower than the predetermined temperature value of 10° C., and thus a predetermined temperature threshold value of 90° C. will be utilized as the temperature threshold value (i.e. the throttling point) for the integrated circuit 200. Please note that the above embodiment is only for an illustrative purpose and is not meant to be a limitation of the present invention. For example, the predetermined temperature value can be changed according to different design requirements.

If the current temperature value of the component 210 is 85° C. and the initial temperature value of the component 210 is 70° C., and the predetermined temperature value is 10° C., then the detecting result shows the temperature variance of the component 210 is 15° C., which is not lower than the predetermined temperature value of 10° C., and thus a second temperature threshold value will be determined as the temperature threshold value for the integrated circuit 200.

The function of determining the second temperature threshold value comprises: calculating a difference between the predetermined temperature threshold value and a temperature variance of the integrated circuit 200 corresponding to the temperature variance of the component 210 to generate a calculating result; comparing the calculating result with the first temperature threshold value of 70° C.; if the calculating result is higher than the first temperature threshold value of 70° C., then utilizing the calculating result as the second temperature threshold value; and if the calculating result not higher than the first temperature threshold value of 70° C., then utilizing the first temperature threshold value of 70° C. as the second temperature threshold value. The temperature variance of the integrated circuit 200 is generated by multiplying a cellphone parameter with the temperature variance of the component 210.

For example, if the predetermined temperature threshold value is 90° C., the cellphone parameter is 1, the current temperature value of the component 210 is 85° C. and the initial temperature value of the component 210 is 70° C. (i.e. the temperature variance of the component 210 is 15° C.), then the calculating process is 90° C.−(85° C.−70° C.)*1, and the calculating result is 75° C., which is higher than the first temperature threshold value of 70° C., and thus the calculating result of 75° C. is utilized as the second temperature threshold value.

If the predetermined temperature threshold value is 90° C., the cellphone parameter is 2, the current temperature value of the component 210 is 85° C. and the initial temperature value of the component 210 is 70° C. (i.e. the temperature variance of the component 210 is 15° C.), then the calculating process is 90° C.−(85° C.−70° C.)*2, and the calculating result is 60° C., which is not higher than the first temperature threshold value of 70° C., and thus the first temperature threshold value of 70° C. is utilized as the second temperature threshold value.

In other words, assume the temperature threshold value for the integrated circuit 200 to be Tj_limit, the current temperature value of the component 210 to be T_PCB_now, the initial temperature value of the component 210 to be T_PCB_ini, the predetermined temperature value to be T_pcb_hot, the predetermined temperature threshold value to be Tj_high, the second temperature threshold value to be Tj_low, and the above thermal control process of the thermal control system 100 can be summarized by the below algorithm:

If($T\_PCB\_now - T\_PCB\_ini) < T\_pcb\_hot$

Then $Tj\_limit = Tj\_high$

Figure 3:
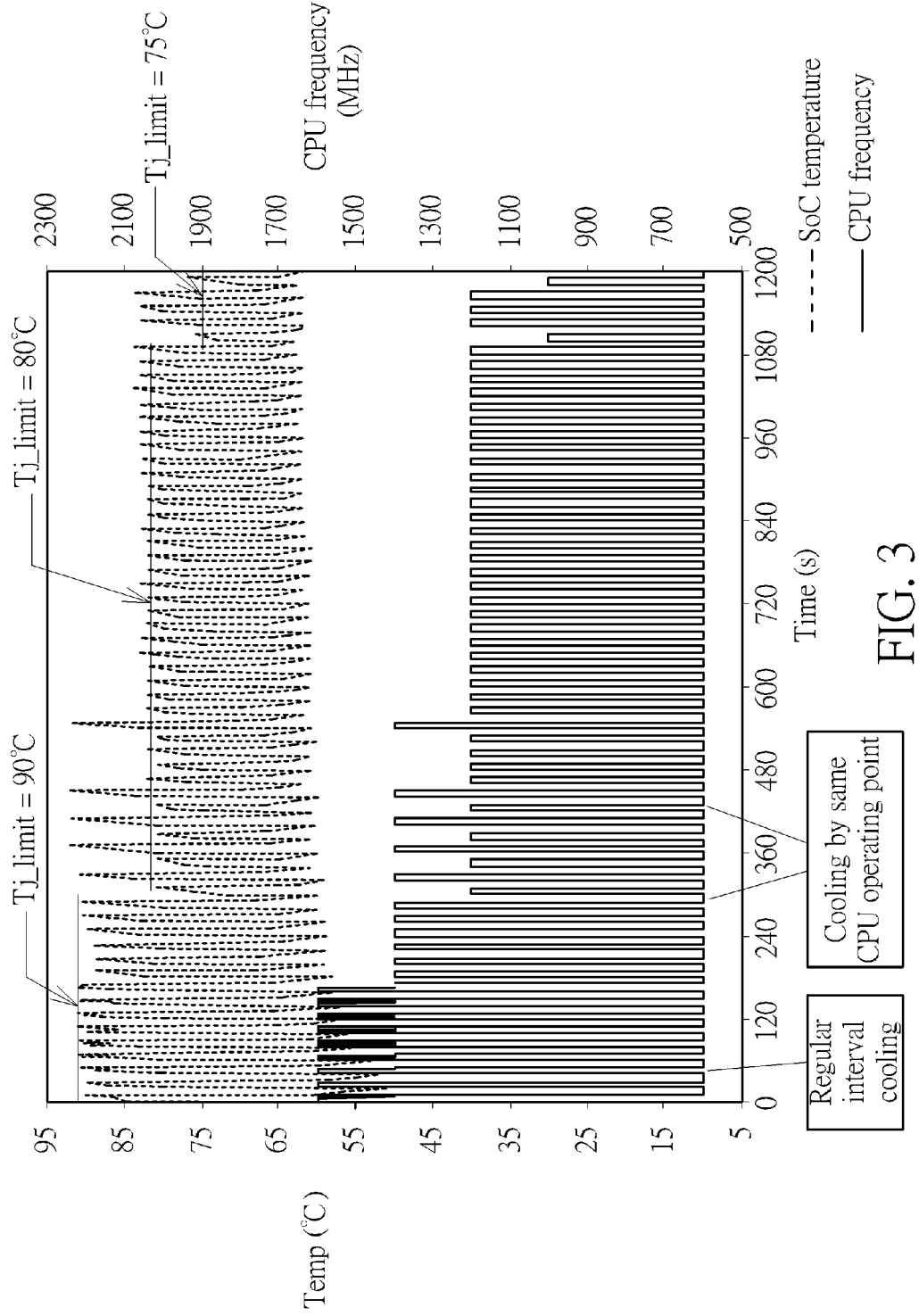
FIG. 3 is a timing diagram illustrating an exemplary embodiment of the thermal control process performed by the thermal control system in FIG. 2.

Else $Tj\_limit = Tj\_low = Max(Tj\_high - (T\_PCB\_now - T\_PCB\_ini)*A;$ $Tj\_lowbound)$ Please refer to FIG. 3. FIG. 3 is a timing diagram illustrating an exemplary embodiment of the above thermal control process. As shown in FIG. 3, a better CPU performance without too hot in the skin of the electronic device 300 can be achieved, and the present invention can better fit environmental changes and have a better dynamic thermal management. For example, the full-speed time of the cellphone in FIG. 3 is about 30 seconds, and the thermal control method in the present invention starts to throttle after 30 seconds. In addition, the thermal control method in the present invention does not only detect the current temperature of the SoC of the cellphone, and does not perform the dynamic thermal management only according to the current temperature of the SoC of the cellphone. Instead, the present invention consider the current temperature of the SoC of the cellphone, the temperature variance of the PCB of the cellphone, and the ambient temperature when performing the dynamic thermal management. Thus, the present invention can better fit environmental changes and have a better dynamic thermal management.

Figure 4:
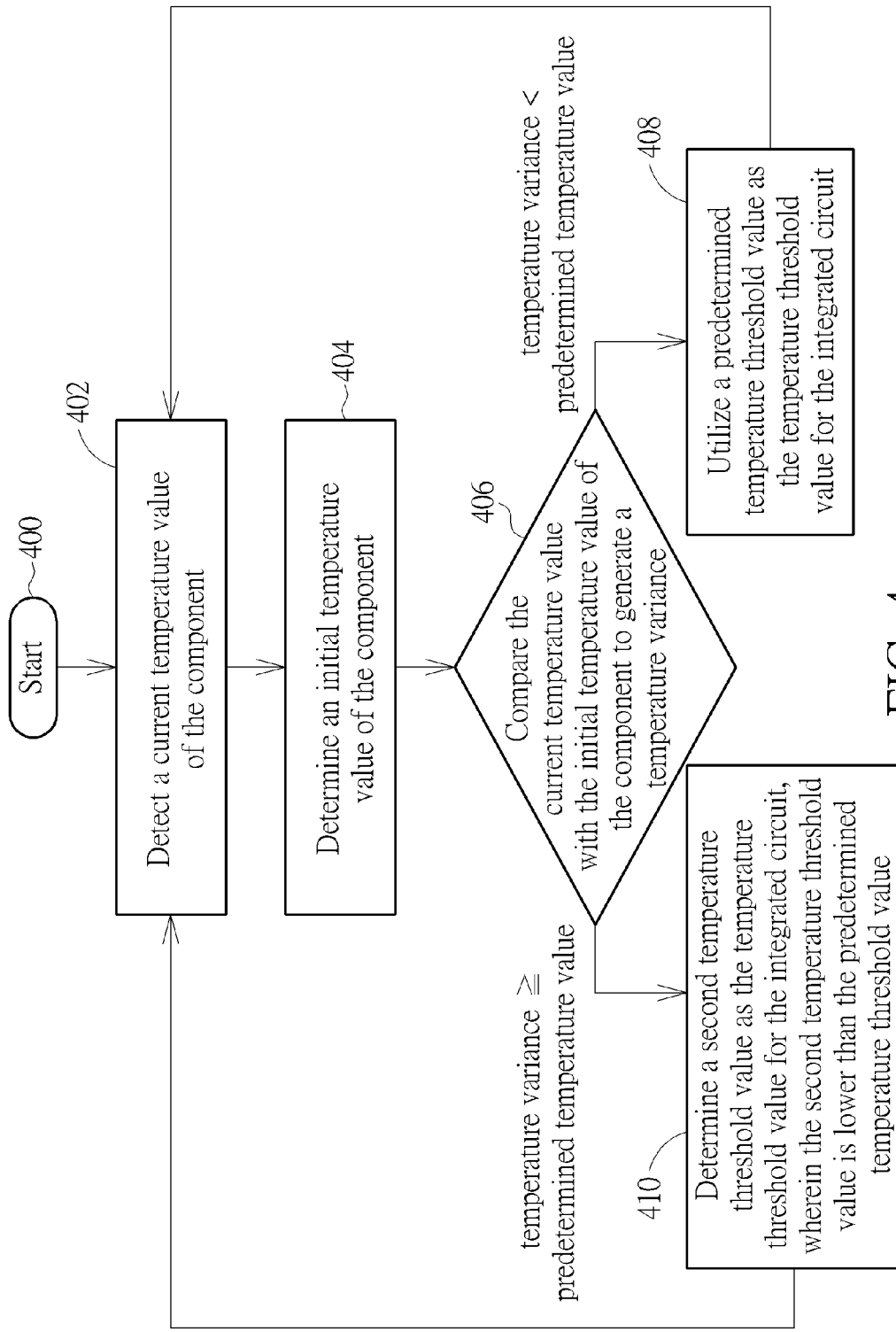
FIG. 4 is a flowchart showing a thermal control method in accordance with the operation schemes of the thermal control system FIG. 2.

Please refer to FIG. 4. FIG. 4 is a flowchart showing a thermal control method in accordance with the operation schemes of the thermal control system 100 in the above embodiment. Provided that the result is substantially the same, the steps in FIG. 4 are not required to be executed in the exact order shown in FIG. 4. The thermal control method in accordance with the above embodiment of the thermal control system 100 in the present invention comprises the following steps:

Step 400: Start.

Step 402: Detect a current temperature value of the component.

Step 404: Determine an initial temperature value of the component.

Step 406: Compare the current temperature value with the initial temperature value of the component to generate a temperature variance; if the temperature variance is lower than a predetermined temperature value, then go to Step 408; and if the temperature variance is not lower than the predetermined temperature value, then go to Step 410.

Step 408: Utilize a predetermined temperature threshold value as the temperature threshold value for the integrated circuit.

Step 410: Determine a second temperature threshold value as the temperature threshold value for the integrated circuit, wherein the second temperature threshold value is lower than the predetermined temperature threshold value.

In addition, the step 404 of determining the initial temperature value of the component comprises: comparing the detected current temperature value with a first temperature threshold value; if the detected current temperature value is higher than the first temperature threshold value, then utilizing the first temperature threshold value as the initial temperature value of the component; and if the detected current temperature value is lower than the first temperature threshold value, then utilizing a power value of the integrated circuit, a package thermal resistance coefficient, and an ambient temperature value to calculate the initial temperature value of the component.

The step 410 of determining the second temperature threshold value comprises: calculating a difference between the predetermined temperature threshold value and a temperature variance of the integrated circuit corresponding to the temperature variance of the component to generate a calculating result; comparing the calculating result with the first temperature threshold value; if the calculating result is higher than the first temperature threshold value, then utilizing the calculating result as the second temperature threshold value; and if the calculating result not higher than the first temperature threshold value, then utilizing the first temperature threshold value as the second temperature threshold value.

Briefly summarized, the thermal control system and the thermal control method disclosed by the present invention can achieve a better CPU performance without too hot in the skin of the electronic device, and the present invention can better fit environmental changes and have a better dynamic thermal management.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A thermal control method for an integrated circuit in an electronic device, comprising:
   detecting a current temperature value of a component of the electronic device;
   determining an initial temperature value of the component; and
   comparing the current temperature value with the initial temperature value of the component to detect a temperature variance of the component and generate a detecting result; and
   determining a temperature threshold value for the integrated circuit as a throttling point according to the detecting result;
   wherein the step of determining the initial temperature value of the component comprises:
      comparing the detected current temperature value with a first temperature threshold value.

2. The thermal control method of claim 1, wherein the step of determining the initial temperature value of the component further comprises:
   if the detected current temperature value is higher than the first temperature threshold value, then utilizing the first temperature threshold value as the initial temperature value of the component; and
   if the detected current temperature value is lower than the first temperature threshold value, then utilizing a power value of the integrated circuit, a package thermal resistance coefficient, and an ambient temperature value to calculate the initial temperature value of the component.

3. The thermal control method of claim 1, wherein the step of determining the temperature threshold value for the integrated circuit according to the detecting result comprises:
   if the detecting result shows the temperature variance is lower than a predetermined temperature value, then utilizing a predetermined temperature threshold value as the temperature threshold value for the integrated circuit; and
   if the detecting result shows the temperature variance is not lower than the predetermined temperature value, then determining a second temperature threshold value as the temperature threshold value for the integrated circuit, wherein the second temperature threshold value is lower than the predetermined temperature threshold value.

4. The thermal control method of claim 3, wherein the step of determining the second temperature threshold value comprises:
   calculating a difference between the predetermined temperature threshold value and a temperature variance of the integrated circuit corresponding to the temperature variance of the component to generate a calculating result;
   comparing the calculating result with a first temperature threshold value;
   if the calculating result is higher than the first temperature threshold value, then utilizing the calculating result as the second temperature threshold value; and
   if the calculating result not higher than the first temperature threshold value, then utilizing the first temperature threshold value as the second temperature threshold value.

5. The thermal control method of claim 2, wherein the first temperature threshold value is corresponding to a predetermined temperature threshold value of a housing of the electronic device.

6. The thermal control method of claim 1, wherein the electronic device is a cellphone.

7. The thermal control method of claim 6, wherein the component is a printed circuit board (PCB) of the cellphone.

8. The thermal control method of claim 6, wherein the integrated circuit is a system on chip (SoC) of the cellphone.

9. A thermal control system for an integrated circuit in an electronic device, comprising:
- a detecting unit, for detecting a temperature variance of a component of the electronic device to generate a detecting result; and
- a determining unit, coupled to the detecting unit, for determining a temperature threshold value for the integrated circuit as a throttling point according to the detecting result;
- wherein the function of detecting the temperature variance of the component of the electronic device to generate the detecting result comprises:
  - detecting a current temperature value of the component;
  - determining an initial temperature value of the component; and
  - comparing the current temperature value with the initial temperature value of the component to generate the detecting result;
- wherein the function of determining the initial temperature value of the component comprises:
  - comparing the detected current temperature value with a first temperature threshold value;
  - if the detected current temperature value is higher than the first temperature threshold value, then utilizing the first temperature threshold value as the initial temperature value of the component; and
  - if the detected current temperature value is lower than the first temperature threshold value, then utilizing a power value of the integrated circuit, a package thermal resistance coefficient, and an ambient temperature value to calculate the initial temperature value of the component.

10. The thermal control system of claim 9, wherein the function of determining the initial temperature value of the component further comprises:
- if the detected current temperature value is higher than the first temperature threshold value, then utilizing the first temperature threshold value as the initial temperature value of the component; and
- if the detected current temperature value is lower than the first temperature threshold value, then utilizing a power value of the integrated circuit, a package thermal resistance coefficient, and an ambient temperature value to calculate the initial temperature value of the component.

11. The thermal control system of claim 9, wherein the function of determining the temperature threshold value for the integrated circuit according to the detecting result comprises:
- if the detecting result shows the temperature variance is lower than a predetermined temperature value, then utilizing a predetermined temperature threshold value as the temperature threshold value for the integrated circuit; and
- if the detecting result shows the temperature variance is not lower than the predetermined temperature value, then determining a second temperature threshold value as the temperature threshold value for the integrated circuit, wherein the second temperature threshold value is lower than the predetermined temperature threshold value.

12. The thermal control system of claim 11, wherein the function of determining the second temperature threshold value comprises:
- calculating a difference between the predetermined temperature threshold value and a temperature variance of the integrated circuit corresponding to the temperature variance of the component to generate a calculating result;
- comparing the calculating result with a first temperature threshold value;
- if the calculating result is higher than the first temperature threshold value, then utilizing the calculating result as the second temperature threshold value; and
- if the calculating result not higher than the first temperature threshold value, then utilizing the first temperature threshold value as the second temperature threshold value.

13. The thermal control system of claim 10, wherein the first temperature threshold value is corresponding to a predetermined temperature threshold value of a housing of the electronic device.

14. The thermal control system of claim 9, wherein the electronic device is a cellphone.

15. The thermal control system of claim 14, wherein the component is a printed circuit board (PCB) of the cellphone.

16. The thermal control system of claim 14, wherein the integrated circuit is a system on chip (SoC) of the cellphone.

17. A thermal control method for an integrated circuit in an electronic device, comprising:
- detecting a temperature variance of a component of the electronic device to generate a detecting result; and
- determining a temperature threshold value for the integrated circuit as a throttling point according to the detecting result;
- wherein the step of detecting the temperature variance of the component of the electronic device to generate the detecting result comprises:
  - detecting a current temperature value of the component;
  - determining an initial temperature value of the component; and
  - comparing the current temperature value with the initial temperature value of the component to generate the detecting result;
- wherein the step of determining the temperature threshold value for the integrated circuit according to the detecting result comprises:
  - if the detecting result shows the temperature variance is lower than a predetermined temperature value, then utilizing a predetermined temperature threshold value as the temperature threshold value for the integrated circuit; and
  - if the detecting result shows the temperature variance is not lower than the predetermined temperature value, then determining a second temperature threshold value as the temperature threshold value for the integrated circuit, wherein the second temperature threshold value is lower than the predetermined temperature threshold value.

18. The thermal control method of claim 17, wherein the step of determining the initial temperature value of the component comprises:
- comparing the detected current temperature value with a first temperature threshold value;
- if the detected current temperature value is higher than the first temperature threshold value, then utilizing the first temperature threshold value as the initial temperature value of the component; and if the detected current temperature value is lower than the first temperature threshold value, then utilizing a power value of the integrated circuit, a package thermal resistance coefficient, and an ambient temperature value to calculate the initial temperature value of the component.

19. A thermal control system for an integrated circuit in an electronic device, comprising:

a detecting unit, for detecting a temperature variance of a component of the electronic device to generate a detecting result; and a determining unit, coupled to the detecting unit, for determining a temperature threshold value for the integrated circuit as a throttling point according to the detecting result;

wherein the function of detecting the temperature variance of the component of the electronic device to generate the detecting result comprises:

detecting a current temperature value of the component;

determining an initial temperature value of the component; and comparing the current temperature value with the initial temperature value of the component to generate the detecting result;

wherein the function of determining the temperature threshold value for the integrated circuit according to the detecting result comprises:

if the detecting result shows the temperature variance is lower than a predetermined temperature value, then utilizing a predetermined temperature threshold value as the temperature threshold value for the integrated circuit; and if the detecting result shows the temperature variance is not lower than the predetermined temperature value, then determining a second temperature threshold value as the temperature threshold value for the integrated circuit, wherein the second temperature threshold value is lower than the predetermined temperature threshold value.

20. The thermal control system of claim 19, wherein the function of determining the initial temperature value of the component comprises:

comparing the detected current temperature value with a first temperature threshold value;

if the detected current temperature value is higher than the first temperature threshold value, then utilizing the first temperature threshold value as the initial temperature value of the component; and if the detected current temperature value is lower than the first temperature threshold value, then utilizing a power value of the integrated circuit, a package thermal resistance coefficient, and an ambient temperature value to calculate the initial temperature value of the component.

* * * * *